United States Patent [19]

Rigon

[11] 4,255,825
[45] Mar. 17, 1981

[54] BOOTS OF INJECTION MOLDED PLASTIC AND PROCESS THEREFOR

[75] Inventor: Pietro L. Rigon, Vicenza, Italy

[73] Assignee: Rigon, S.P.A., Vicenza, Italy

[21] Appl. No.: 46,016

[22] Filed: Jun. 6, 1979

Related U.S. Application Data

[62] Division of Ser. No. 895,019, Apr. 10, 1978.

[51] Int. Cl.³ .................. A43D 9/00; A43B 1/10; A43B 13/28
[52] U.S. Cl. .................. 12/142 RS; 36/24.5; 36/4
[58] Field of Search .............. 36/4, 24.5, 76 R, 76 C, 36/83, 87, 91; 12/142 R, 142 RS, 142 J

[56] References Cited

U.S. PATENT DOCUMENTS

| | | | |
|---|---|---|---|
| 2,867,919 | 1/1959 | Nappa | 36/24.5 |
| 3,646,692 | 3/1972 | Glogg | 36/24.5 |
| 3,855,657 | 12/1974 | Mazzotta | 12/142 RS |
| 4,024,652 | 5/1977 | Brilli | 12/142 RS |

FOREIGN PATENT DOCUMENTS

| | | | |
|---|---|---|---|
| 676801 | 12/1963 | Canada. | |
| 1476115 | 2/1967 | France | 36/24.5 |
| 1555843 | 12/1968 | France | 36/24.5 |

*Primary Examiner*—Patrick D. Lawson
*Attorney, Agent, or Firm*—Cooper, Dunham, Clark, Griffin & Moran

[57] ABSTRACT

In the injection molding of plastic boots, a reinforced arch and heel construction is disclosed wherein a reinforced insole member, of comparatively rigid material formed in a single piece with a rigid heel portion, is incorporated into the two step process of molding the upper portion and then the sole portion of the boot. In one embodiment the reinforced member is molded to the boot upper during the first step of the molding process, and in an alternative embodiment the reinforcement member is incorporated into the boot during the second step of the molding process. A third simpler embodiment utilizes a conventional wood screw as the heel portion of the reinforcement member, and the member may be inserted after molding of the boot.

15 Claims, 7 Drawing Figures

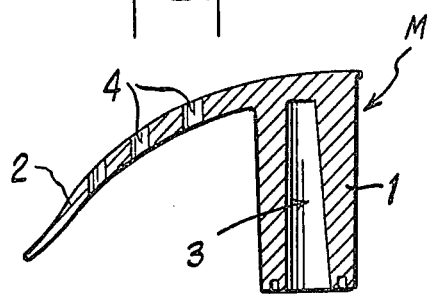
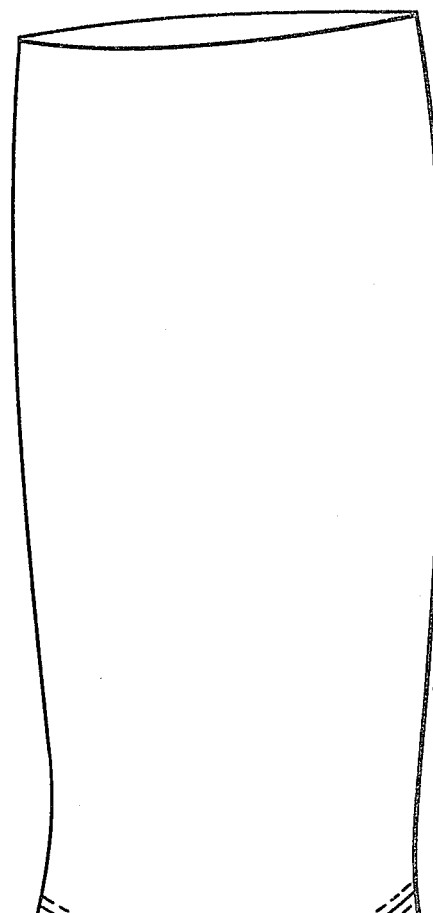
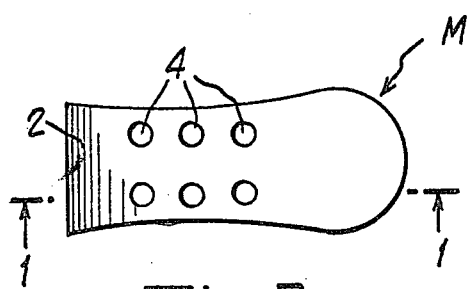
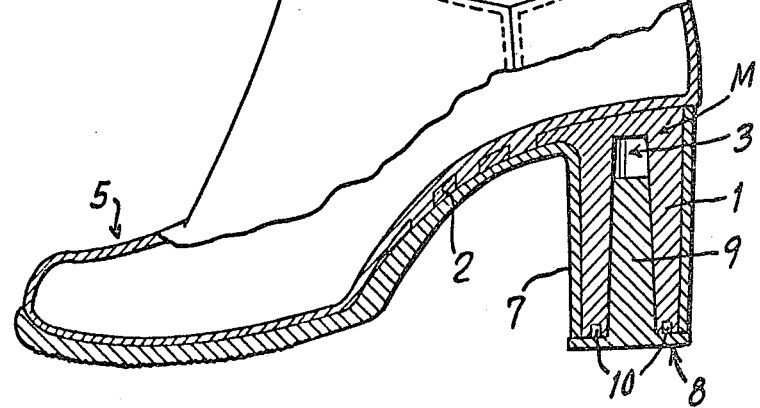

BOOTS OF INJECTION MOLDED PLASTIC AND PROCESS THEREFOR

This is a division of application Ser. No. 895,019, filed Apr. 10, 1978.

BACKGROUND OF THE INVENTION

The present invention relates to the manufacturing of boots made from injection molded plastic material, and more particularly to a process, and a boot resulting therefrom, wherein a reinforced arch and heel member is incorporated into the boot during the injection molding process.

Boots made entirely from injection molded plastic material have been used for some time as a substitute for traditional leather boots. The plastic material may be made to resemble the appearance of leather, and such boots have the advantage of being more economical than leather and are completely waterproof. However, they have had certain disadvantages such as the lack of rigidity of the heel in relation to the sole and a lack of resiliency. These disadvantages are a particular problem in the case of ladies' boots with rather high heels.

It is the purpose of the present invention to provide a process which overcomes these disadvantages simply and effectively and which produces improved boots having rigid arch and heel structures.

SUMMARY OF THE INVENTION

The present invention involves the use of a rigid arch and heel structure which is incorporated into an injection molded plastic boot during manufacture to act as a reinforcement between the sole and heel resulting in an improved boot construction.

In one embodiment a rigid reinforcement member, consisting of an arch portion and a heel portion formed from a single integral piece of rigid plastic or suitable metal, is disposed within the injection mold and incorporated into the plastic material injected into the mold during the initial stage of the process when the entire upper of the boot is formed including the foot from which the heel portion, which is part of the reinforcement member, projects. During the second stage of injection of plastic material for the purpose of molding the sole and the heel covering, the plastic material covers the underside of the arch portion and the outside of the heel portion of the reinforcement member. Suitable passages are provided in the reinforcement member to accommodate and achieve satisfactory union with the extruded material and the subsequently attached lift.

An alternative embodiment incorporates the reinforcement member into the boot during the second stage of injection molding, that is, during molding of the sole and heel covering. The reinforcement member is secured to the insole of the boot, which has already been molded in the initial production stage, by means of suitable passages arranged in the instep part of the arch portion and by means of longitudinal grooves in the body of the heel portion, the plastic material being injected into these passages and grooves in the course of the second stage of injection molding. The lift is inserted into the heel portion by means of projections extending from the lift into blind holes in the bottom of the heel body.

A third embodiment comprises a reinforcement member in the form of a rigid arch portion having a threaded screw therethrough, which screw acts as the heel portion of the reinforcement member. This member is suitable for incorporation in a boot after completion of the conventional injection molding process. The screw is screwed into a synthetic resin core inserted into the heel and the screw head is covered by a leather lining which is glued to the insole and over the arch portion to protect the wearer's foot.

It will be seen that the reinforcement member and processes of the present invention have been described in connection with the manufacturing of the injection molding of plastic boots, but they may be found equally applicable to the manufacture of other injection-molded footwear.

BRIEF DESCRIPTION OF THE DRAWINGS

FIG. 1 is a side elevation in cross section of a reinforcement member in accordance with the present invention consisting of integral arch and heel portions;

FIG. 2 is a plan view of the reinforcement member shown in FIG. 1;

FIG. 3 is a side elevation partly in cross section of a boot made by the process of the present invention and using the reinforcement member of FIG. 1;

DETAILED DESCRIPTION OF THE INVENTION

Figure 4:
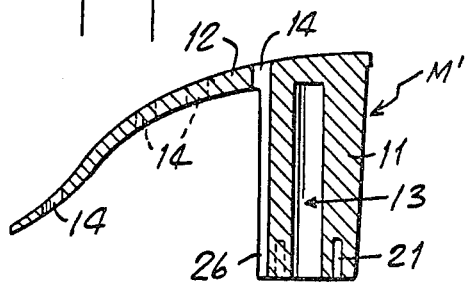
FIG. 4 is a side elevation in cross section of another reinforcement member in accordance with the present invention.

A reinforcement insole member in accordance with the present invention is shown in detail in FIG. 1 and may be constructed of a suitable rigid plastic material or of a suitable metal or metal alloy or a combination of both. In this embodiment, which is intended for use in high heel boots, the member M comprises a heel portion 1, having an internal cavity 3 which may be of truncated conical shape to accommodate a lift for the heel, and an integrally formed arch portion 2. The forwardly disposed arch portion 2 is designed to support the boot instep, that is, the part of the sole of the boot extending between the heel and the ground-contacting portion of the sole. Arch portion 2 is provided with a series of holes 4 designed to accommodate plastic material injected therein during the initial phase of the process of forming the boot. As seen in FIG. 2 the holes may suitably be formed in two parallel series along the length of the arch portion 2.

In accordance with the process of the present invention, the reinforcement insole member M is disposed within the injection mold before it receives the plastic material in the initial stage of the molding process during which the entire upper U of the boot is formed. As a result, upon injection of the plastic during this stage, the upper of the boot assumes its shape as shown in FIG. 3 complete with foot 5 and including the reinforcement member M which is incorporated therein, by accommodating the plastic material in the holes 4 of the arch portion 2, with the heel portion 1 projecting from the foot 5. Cooperation of the plastic material and the reinforcement member produces a union between the two. The configuration of the mold typically used for this first phase of the injection molding operation is such that the reinforcement member normally will have to be supported within the mold cavity by a suitable pin, as will be appreciated by those skilled in the art.

In the second production phase additional plastic material, again of a suitable type, is injected into the mold to form a sole 6 and the outer covering 7 of the heel. The various plastic materials are joined and an integral boot and heel is accordingly formed.

Upon removal of the boot from the mold, all that then remains to complete the construction is to insert a lift into the base of the heel. A suitable lift 8, provided with an upstanding truncated conical pin 9, may be pressed into cavity 3 in the heel portion of the reinforcement member. Pins 10 may also be formed on the upper surface of the lift 8 to cooperate with corresponding holes in the lower surface of the heel portion and thus improve the stability of the cooperation between the heel portion and the lift.

A reinforced boot will thus have been constructed, that is of great mechanical strength since the arch or insole is rigidly integral with the body of the heel which ensures increased stability and rigidity of the heel in relation to the sole while at the same time improving the resiliency of the heel. Further the process has economic advantages derived from the fact that the reinforcement member is placed directly into the mold used during the initial injection molding phase, thus eliminating the need for any additional operations in securing the reinforcing element within the boot. As a result, improved boots are produced which have characteristics of stability and resilient deformation clearly better than existing plastic boots and which boots may be economically produced.

Figure 5:
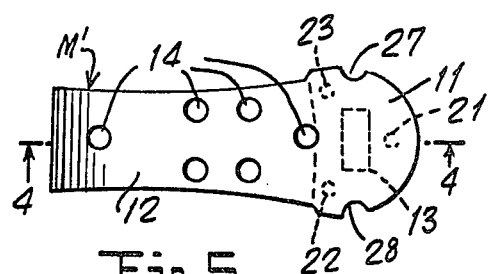
FIG. 5 is a plan view of the reinforcement member of FIG. 4.
Figure 6:
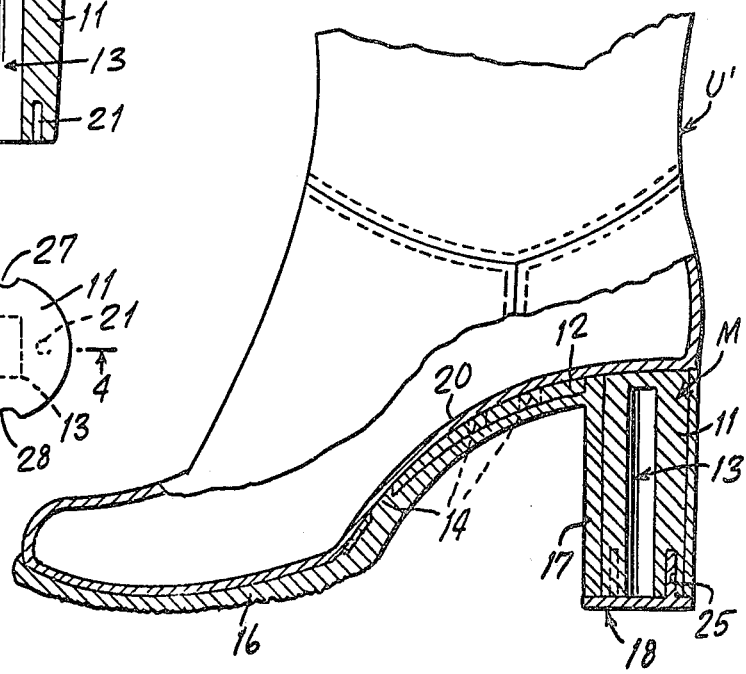
FIG. 6 is a side elevation partly in section of a boot made in accordance with the present invention and using the reinforcement member of FIG. 4.

An alternative embodiment to the process and boot disclosed in connection with FIGS. 1–3 is shown in FIGS. 4–6. This embodiment is directed to avoiding the possible need with the first embodiment for a complex modification of mold construction in order to support the reinforcement member during the initial phase of injection molding. Accordingly, a reinforcement member M' may alternatively be incorporated into the boot during the course of the second stage of injection molding when the sole and heel covering are being produced. In this embodiment during the first molding phase the upper portion U' of the boot is injection molded from plastic material to include, as shown in FIG. 6, an insole portion 20. The reinforcement member M', which may be of a somewhat different construction, is joined to insole portion 20 during the second molding phase.

As shown more clearly in FIGS. 4 and 5, the arch portion 12 of the reinforcement member M' is provided with holes 14 through which the plastic material, injected during the second molding phase, may pass. As a result, this plastic material unites the arch portion 12 with the already-formed insole 20 and the insole with the sole 16 and with the heel covering 17. In addition, lateral grooves 26, 27, and 28 are formed on the sides of the heel portion 11 to provide a better hold between the plastic material forming the heel covering 17 and the sides of the heel portion.

To obviate any need for complicated mold structure modification, the heel portion 11 may also be provided with a cavity 13, preferably rectangular in shape, which may serve to accommodate a suitable guiding and supporting pin. Such a pin can readily be formed on the molding equipment to support the reinforcement member M' during the second phase of injection, as will be appreciated by those skilled in the art. Small cavities 21, 22, and 23 are located laterally on the lower surface of heel portion 11 and accommodate lateral projections 25 extending upwardly from a lift 18 so that the latter may be easily secured to the heel portion 11 when completing boot construction. Cavity 13 may be left empty, if desired, in order to reduce the weight of the boot.

It will thus be seen by those skilled in the art that the mold structure modification required to support the reinforcement member in the mold during the second injection molding phase may be fairly simple, but yet ensures the obtaining of a boot in which the stability and resiliency of the heel in relation to the sole are improved over hitherto known plastic boots. The boot also has a substantial production cost advantage and is considerably easier to assemble as compared with prior processes and even the process of the first-mentioned embodiment.

Figure 7:
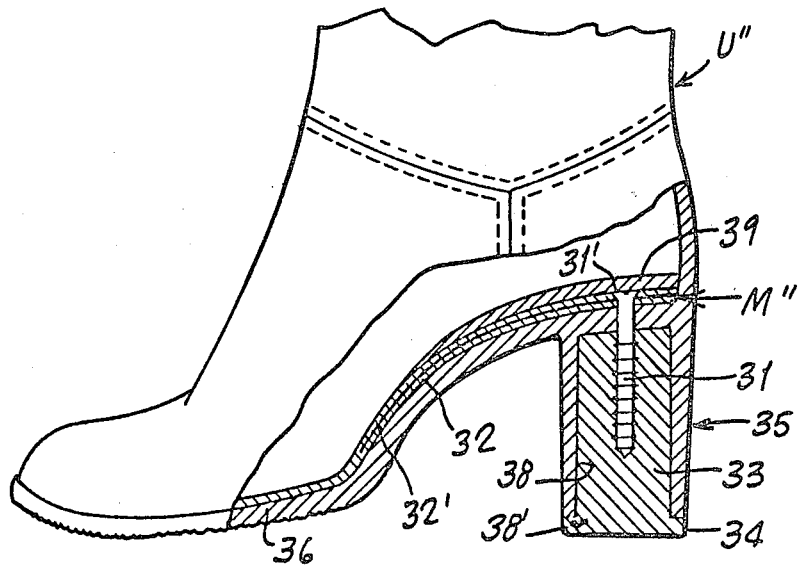
FIG. 7 is a side elevation partly in section of a boot made in accordance with a further embodiment of the present invention.

A third embodiment, shown in FIG. 7 is particularly suitable for incorporating an improved reinforcement member in an already-constructed boot. This embodiment comprises a reinforcement member M" in the form of two pieces. The member M" has an arch portion 32 of a rigid material, which may, for example, have a metal reinforcement 32', running from the boot heel 35 to over about one-third of the sole 36. The arch portion 32 is disposed over the boot insole and secured to the heel by means of a screw 31 of the self-tapping type that acts as the rigid heel portion of the member. This member M" may be secured to the boot heel 35 by screwing the end of the screw 31 into a resin core 33 fitted to the internal cavity 38 in the heel. Resin core 33 may be introduced into the heel cavity through an aperture 38' in the bottom thereof and the cavity may be closed off by a lift 34 formed by molding the same resin. A leather lining 39 for covering the head 31' of the screw 31 may be glued to the insole in order to protect the wearer's foot. This process and combination produces the advantages that the inserted reinforcement insole member may be securely held to the heel by means of a simply-inserted screw which is screwed into a synthetic resin core that may be inserted into the heel by an extremely simple and economical procedure. This procedure produces an improved structural and functional arrangement since it imparts maximum stability to the heel and stiffens the heel-sole structure of the boot which thus no longer becomes deformed in use. The design of the boot may therefore be modified such that the heel may be formed separate from the sole, whereas the prior art ladies' plastic boots it has hitherto been necessary to construct the heels integral with the sole.

While the various embodiments are described in connection with the manufacturing of plastic boots, and particularly ladies' boots with rather high heels, it will be seen that the invention is readily applicable to the manufacture of other injection-molded plastic footwear.

I claim:

1. A process for producing boots made of plastic material and having a reinforcing arch, with an instep portion and a heel body, incorporated in the fusion of the sole and heel, characterized in that the process comprises an initial phase in which the upper body of the boot and the complete insole are formed by injection-molding, and a second phase in which the instep portion is disposed against the insole and the sole and heel covering are formed by injection-molding with the instep portion and the body of the heel of the reinforcing arch being firmly anchored to the insole produced in the initial molding phase by means of passages through said instep portion, and in the sides of the body of the heel.

2. A process as in claim 1 wherein during the second molding phase said reinforcing arch is supported in the mold by a pin on the mold accommodated in a cavity in the bottom of the heel body.

3. A process as in claim 2 wherein said cavity and said pin are rectangular in cross section.

4. A process as in claim 2 wherein after molding a lift is applied to the bottom of the heel body.

5. A boot molded of plastic material and produced by the process comprising the steps of:
   forming a reinforcing arch in a single piece with an insole portion and a heel body and locating in the bottom of the body of the heel an aperture for accommodating a supporting pin for supporting said reinforcing arch in the mold during injection molding;
   forming the upper body of the boot and the complete insole in a single piece in a mold by a first injection molding;
   supporting said reinforcing arch in a mold by inserting a supporting pin on the mold in said aperture at the bottom of the heel body with the insole portion in engagement with the injection molded insole; and
   forming the sole and the outer covering of the heel of the boot by a second injection molding about said reinforcing arch, so supported, completing the formation of the boot with the reinforcing arch surrounded by the injection molded plastic material except for the bottom of the body of the heel.

6. A boot produced by the process according to claim 5 further comprising the steps of forming passages in the insole portion and along the sides of the body of the heel for receiving the plastic material injected in the course of the second injection molding.

7. A boot according to claim 5 characterized in that the reinforcing arch is made of a metallic material.

8. A boot according to claim 5 wherein a lift is applied to the bottom of the heel.

9. A process for producing boots having high heels made of plastic material and including a single-piece reinforcing arch with an insole portion and a heel body, comprising the steps of:
   forming the upper body of the boot and the complete insole in a single piece in a mold by injection molding;
   forming an aperture in the bottom of the heel body for accommodating a supporting pin;
   supporting said reinforcing arch in a mold with the insole portion in engagement with the underside of the injection molded insole by inserting a supporting pin on the mold in said aperture; and
   forming the sole and the outer covering of the heel of the boot by injection molding completing the formation of the boot with the reinforcing arch incorporated therein.

10. A process as in claim 9 wherein said cavity and said pin are rectangular in cross section.

11. A boot made of plastic material and having a reinforcing arch, with an instep portion and a heel body, incorporated in the fusion of the sole and heel and produced by the process comprising an initial phase in which the upper body of the boot and the complete insole are formed by injection-molding and a second phase in which the instep portion is disposed against the insole and the sole and heel covering are formed by injection-molding with the instep portion and the body of the heel of the reinforcing arch being firmly anchored to the insole produced in the initial molding phase by means of passages through said instep portion, and in the sides of the body of the heel.

12. A boot as in claim 11 wherein during the second molding phase, said reinforcing arch is supported in the mold by a pin on the mold accommodated in a cavity in the bottom of the heel body and after molding, a lift is applied to the bottom of the heel body.

13. An article of footwear made of injection molded plastic material using a reinforcement member, in the form of integral rigid arch and heel portions incorporated into the injected plastic material and produced by the process comprising the steps of:
   injecting plastic into a mold to form a complete upper of the footwear including an insole;
   disposing the reinforcement member with its arch portion engaging the formed insole in a mold and supported by a pin on the mold accommodated in a cavity in the bottom of said heel portion; and then
   forming the sole and heel covering of the footwear by injecting plastic into the mold such that this plastic cooperates with the plastic of the upper through passages formed in the arch portion of said member uniting said upper and said sole and heel covering with said reinforcement member disposed therebetween.

14. A high-heeled boot made of plastic material including a single piece reinforcing arch with an insole portion and a heel body and produced by the process wherein:
   the upper body of the boot and the complete insole are formed in a single piece in a mold by injection molding;
   an aperture is formed in the bottom of the heel body for accommodating a supporting pin;
   said reinforcing arch is supported in a mold with the insole portion in engagement with the underside of the injection-molded insole by inserting a supporting pin on the mold into said aperture; and
   the sole and the outer covering of the heel of the boot are formed by injection molding to complete the formation of the boot with the reinforcing arch incorporated therein.

15. A boot as in claim 14 wherein said aperture and said pin are rectangular in cross section.

* * * * *